United States Patent
Sydell et al.

(10) Patent No.: US 9,613,047 B2
(45) Date of Patent: Apr. 4, 2017

(54) AUTOMATIC CONTENT ITEM UPLOAD

(71) Applicant: Dropbox, Inc., San Francisco, CA (US)

(72) Inventors: Alex Sydell, San Francisco, CA (US); Brian Smith, San Francisco, CA (US); Kyle Consalus, San Francisco, CA (US); Tina Wen, San Francisco, CA (US); Anthony (Tony) Grue, San Francisco, CA (US)

(73) Assignee: Dropbox, Inc., San Franciso, CA (US)

( * ) Notice: Subject to any disclaimer, the term of this patent is extended or adjusted under 35 U.S.C. 154(b) by 646 days.

(21) Appl. No.: 13/766,270

(22) Filed: Feb. 13, 2013

(65) Prior Publication Data

US 2014/0229457 A1   Aug. 14, 2014

(51) Int. Cl.
*G06F 17/30* (2006.01)

(52) U.S. Cl.
CPC .. *G06F 17/30194* (2013.01); *G06F 17/30109* (2013.01); *G06F 17/30174* (2013.01); *G06F 17/30619* (2013.01)

(58) Field of Classification Search
CPC ........... G06F 17/3087; G06F 17/30631; G06F 17/30864; G06F 21/10; G06F 17/30722; G06F 17/30619; G06F 17/30067; G06F 11/1451; G06F 11/1458; G06F 17/3002; G06F 17/30091; G06F 17/30109; G06F 17/30321; H04L 67/1065
USPC ........................................................ 707/698
See application file for complete search history.

(56) References Cited

U.S. PATENT DOCUMENTS

| | | | | |
|---|---|---|---|---|
| 6,334,124 B1* | 12/2001 | Bouchard | ............... | G06Q 10/06 |
| 8,843,603 B1* | 9/2014 | Liu et al. | ....................... | 709/222 |
| 8,903,838 B2* | 12/2014 | Hunter | ............. | G06F 17/30097 |
| | | | | 707/658 |
| 8,943,315 B1* | 1/2015 | Ubl | ............................. | 713/165 |
| 8,996,462 B2* | 3/2015 | Macaskill | ............. | H04L 67/306 |
| | | | | 707/634 |
| 2007/0226507 A1* | 9/2007 | Schilling | ............... | G06F 21/645 |
| | | | | 713/176 |
| 2009/0037967 A1* | 2/2009 | Barkan | ................ | H04N 21/222 |
| | | | | 725/105 |
| 2009/0195818 A1* | 8/2009 | Negishi | ....................... | 358/1.15 |
| 2010/0082713 A1* | 4/2010 | Frid-Nielsen | ......... | G06F 17/301 |
| | | | | 707/821 |
| 2010/0235323 A1* | 9/2010 | Zhang | ................... | G06F 19/321 |
| | | | | 707/623 |

(Continued)

*Primary Examiner* — Merilyn Nguyen
(74) *Attorney, Agent, or Firm* — Polsinelli PC (57) ABSTRACT

A client device can be configured to perform a local index search and a server index search to automatically identify and upload content items on the client device that have not been uploaded to an online content management system. A local index search can include creating a unique local identifier of a content item and searching a local upload index that includes the unique local identifier of each content item that has been uploaded. A server index search can include creating a unique server identifier of the content item and searching a server upload index that includes the unique server identifier of each content item stored on the online content management system. Content items that are determined to have not been uploaded to the online content management system based on the results of the two searches, can be uploaded to the content management system by the client device.

22 Claims, 6 Drawing Sheets

(56) References Cited

U.S. PATENT DOCUMENTS

| | | | |
|---|---|---|---|
| 2010/0332401 A1* | 12/2010 | Prahlad | G06F 17/3002 705/80 |
| 2012/0005245 A1* | 1/2012 | Ruiz-Velasco | G06F 17/30123 707/822 |
| 2012/0047539 A1* | 2/2012 | Hao et al. | 725/82 |
| 2012/0159098 A1* | 6/2012 | Cheung | G06F 12/0261 711/162 |
| 2012/0310889 A1* | 12/2012 | McNeil | H04L 67/2857 707/639 |
| 2013/0247117 A1* | 9/2013 | Yamada et al. | 725/93 |
| 2013/0297739 A1* | 11/2013 | Faihe | G06Q 10/101 709/217 |
| 2014/0122451 A1* | 5/2014 | Euresti | G06F 17/3015 707/693 |

* cited by examiner

# AUTOMATIC CONTENT ITEM UPLOAD

TECHNICAL FIELD

The present technology pertains to online content storage, and more specifically pertains to automatically uploading content items to an online content management system.

BACKGROUND

Cloud storage accounts allow users to store their content items in an online storage account that can be accessed from any computing device with a network connection. Users can thus upload content items such as pictures, songs, documents, etc. created on a computing device to their online storage account and later access the content items from different computing devices. Although convenient, managing the upload of content items can be difficult. For example, a user must remember which content items have and have not been uploaded from the multiple computing devices to avoid uploading duplicate content items and/or forgetting to upload a content item. Accordingly, there is a need for an improved method of uploading content items to an online storage account.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically uploading content items to an online content management system. A client device can be configured to automatically identify content items that have not been uploaded to the online content management system and upload the identified content items to the online content management system. To accomplish this, a local index search of a local upload index can be performed. The local upload index can be an index created and maintained by a client device that identifies each content item uploaded to the online content management system by the client device. For example, upon uploading a content item to the online content management system, the client device can be configured to add a new record to the local upload index that identifies the content item.

To perform a local index search, a unique local identifier of a content item can be created and used to search the local upload index, which can include the unique local identifier of each content item that has been uploaded to the online content management system from the client device. A unique local identifier can be created in numerous ways. In some embodiments, the unique local identifier can be created using metadata associated with a content item. For example, a unique local identifier can be created by concatenating the content items file name and data size.

To further ensure that a content item has not been uploaded to the online content management system, such as by another client device linked to the same user account, a server index search of a server upload index can be performed. The server upload index can be an index created by the online content management system that identifies the content items stored on the online content management system. The server upload index can be downloaded to the client device and a server index search can be performed to determine whether a content item has been uploaded to the online content management system.

To perform a server index search, a unique server identifier of the content item can be created and used to search the server upload index, which can include the unique server identifier associated with each content item that is stored on the online content management system. A unique server identifier can be created in numerous ways. In some embodiments, the unique server identifier can be created from the content item. For example, a portion of the content item can be used as an input in a hashing algorithm. The resulting hash output can be the unique server identifier. For example, the unique server identifier can be created by using the first 8 kilobytes of the content item as input to a hashing algorithm. In some embodiments, the server identifier can be created by using the concatenation of the first 8 kb of a content item and the file size of the content item as input to a hashing algorithm.

Content items that are determined to have not been uploaded to the online content management system, based on a local index search and a server index search performed on the content items, can be uploaded to the online content management system by the client device. Further, the client device can be configured to update the local upload index to include the unique local identifier for a content item, upon uploading the content item. In some embodiments, the client device can also update the server upload index stored on the client device to include the unique server identifier for a content item upon uploading the content item. In some embodiments, the online content management system can be configured to update the server content index stored on the online content management system upon receiving a content item. Further, the online content management system can be configured to download an updated server content index to the client device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically uploading content items to an online content management system. A client device can be configured to automatically identify content items that have not been uploaded to the online content management system and upload the identified content items to the online content management system. To accomplish this, a local index search and server index search can be performed for a content item to determine whether the content item has been uploaded to the online content management system.

A local index search can include creating a unique local identifier of a content item and searching a local upload index for the unique local identifier. The local upload index can include the unique local identifier of each content item that has been uploaded to the online content management system from the client device.

A server index search can include creating a unique server identifier of the content item and searching a server upload index for the unique server identifier. The server upload index can be an index received by the client device from the online content management system that includes the unique server identifier of each content item stored on the online content management system.

Content items that are determined to have not been uploaded to the online content management system, based on a local index search and a server index search performed on the content items, can be uploaded to the content management system by the client device.

Figure 1:
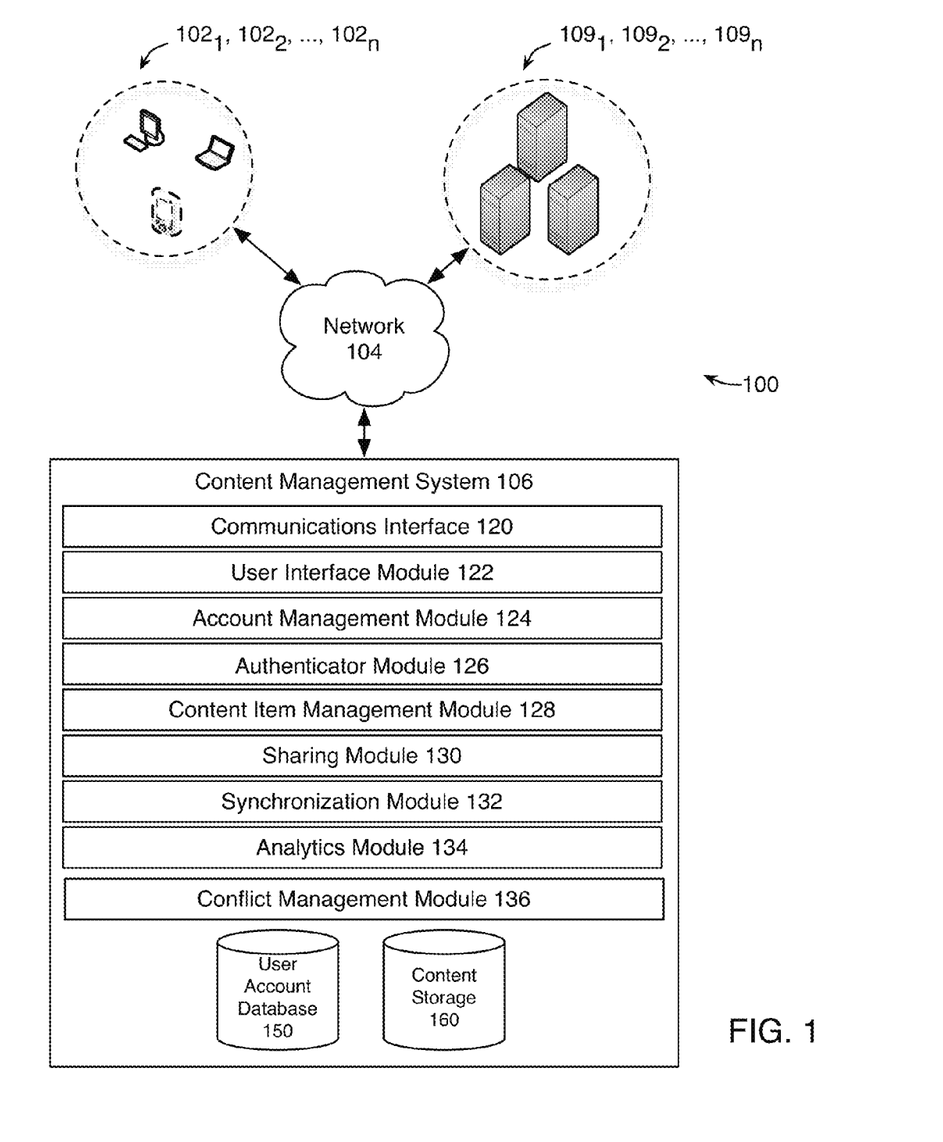
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content items, such as documents, text files, audio files, video files, etc., from one or more client devices 102 authorized on the account. Content items can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device 102$_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 and user devices 102 are presented with specific components, it should be understood by one skilled in the art, that the architectural configuration of content management system 106 and user devices 102 are simply one possible configuration and that other configurations with more or less components are also possible. For example, FIG. 2, which is described in view of FIG. 1, shows one exemplary embodiment of client device 102, including content upload module 205. Content upload module 205 can be configured to automatically upload content items to content management system 106.

Figure 2:
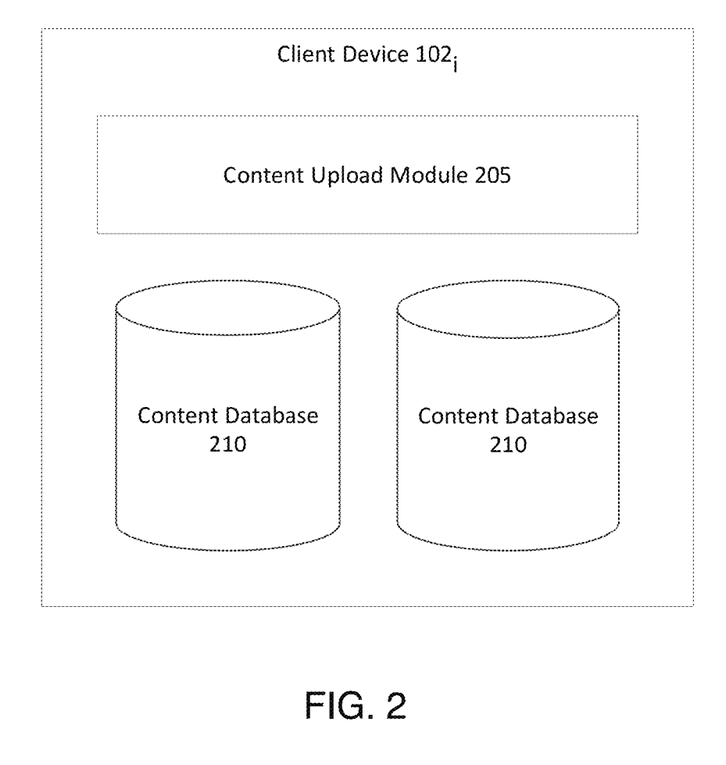
FIG. 2 show an exemplary embodiment of a client device.

To accomplish the automatic upload of content items to content management system 106, content upload module 205 can be configured to identify content items stored on client device $102_i$ that have not been uploaded to content management system 106. Content upload module 205 can further be configured to upload the identified content items to content management system 106.

To determine whether a content item stored on client device $102_i$ has been uploaded to content management system 106, content upload module 205 can be configured to perform a local index search for the content item. A local index search can include searching a local upload index created and maintained by client device $102_i$ that includes an entry for each content item that has been uploaded to content management system 106 from client device $102_i$.

Client device $102_i$ can include content database 210 configured to store content items, and content upload index database 215 configured to store the local upload index. Content upload module 205 can be configured to communicate with both content database 210 and content upload index database 215 to access the content items stored on client device $102_i$ and search the local upload index to determine if a content item stored on client device $102_i$ has not been uploaded to content management system 106.

In some embodiments, a content item can be identified in the local upload index by a unique local identifier created to identify the content item. Thus the local upload index can include the unique local identifier for each content item that has been uploaded to content management system 106. To perform a local index search of a content item, content upload module 205 can first create a unique local identifier for the content item and use the created unique local identifier to search the content upload index.

Content upload module 205 can be configured to create a unique local identifier using any of a variety of methods known in the art, however the method used should preferably be deterministic to yield the same output when given the same input. Thus, given the same input twice, content upload module 205 should create two local unique identifiers that are "equal" to each other, i.e. consist of the same sequence of characters. Furthermore, the method used to create a unique local identifier should preferably result in a unique outcome for each unique input.

In some embodiments, the local unique identifier of a content item can be created using metadata associated with the content item, such as a file name, file size, etc. Creating the local unique identifier from metadata associated with the content item can be advantageous because the metadata can be retrieved quickly and easily without the content item itself being opened or accessed. Thus, the unique local identifier can be created quickly.

In some embodiments, the local unique identifier can be created using the file name and file size of the content item. For example, the unique local identifier can be created by concatenating the file name and the file size. Thus, a unique identifier created for a content item named file1.jpg with a file size of 12345 kb can be "file.jpg12345". Alternatively, in some embodiments, the unique local identifier can be a concatenation of the file name and file size separated by a backslash. Thus, using the previous example, the resulting unique local identifier can be "file.jpg/12345". These are just two possible examples and are not meant to be limiting. One skilled in the art would recognize that the unique local identifier can be created in various ways known in the art, and the present disclosure contemplates all such methods.

To complete the local index search of a content item, content upload module 205 can use the unique local identifier created from the content item, to search the local upload index. For example, the local upload index can include the unique local identifier of each content item that has been uploaded to content management system 106 from client device $102_i$. Thus, if the unique local identifier for a content item is not found in the local upload index, content upload module 205 can determine that the content item has not been uploaded to content management system 106 by client device $102_i$. Likewise, if the unique local identifier for a content item is found in the local upload index, content upload module 205 can determine that the content item has been uploaded to content management system 106 by client device 102i.

Alternatively, in some embodiments, the local upload index can include the unique local identifier of content items that have not been uploaded to content management system 106, but have been marked to not be uploaded to content management system 106. For example, in some embodiments, a user may not wish to have certain content items uploaded to content management system 106 and thus can mark the content item to not be uploaded. In this type of situation, the unique local identifier of the content item can be added to the local upload index to ensure that the content item is not uploaded to content management system 106 even though it has not been uploaded.

In some embodiments, content upload module 205 can be configured to perform a local index search for each content item stored on client device $102_i$. Alternatively, in some embodiments, content upload module 205 can be configured to perform a local index search for only a portion of the content items stored on client device $102_i$. For example, in some embodiments, content database 210 can be configured to store content items in an indexed list, such as an array or linked list, such that the newest content items are added to the end of the list. Content upload module 205 can be configured to perform a local index search on the content items on the list in reverse order, starting with the most recent entry. To minimize the number of local index searches performed, content upload module 205 can be configured to only perform a local index search on content items until a local index search returns that a content item has already been uploaded to content management system 106. Thus, once content upload module 205 has determined that a content item has already been uploaded to content management system 106, it can be assumed that the remaining unsearched content items in content database 210 have also already been uploaded because they were entered into content database 210 prior to the content item that has been determined to have already been uploaded.

Traversing a list of content items in memory to perform a local index search can be particularly advantageous in embodiments in which upload module 205 is responding to an indication that something has changed on client device $102_i$. In some embodiments, an operating system running on client device $102_i$ can be configured to notify upload module 205 that a change has occurred on client device $102_i$, while not providing further details of the change. For example, the operating system can be configured to notify upload module 205 upon detecting a change in memory on client device $102_i$ possible indicating that a content item has been added. The operating system can notify upload module 205 using an API provided by upload module 205. Thus, upload module 205 can traverse memory in reverse order to perform a local index search and identify any content items that have not been uploaded.

In some embodiments, content upload module 205 can be configured to only upload specified types of content items or content items created or received from specified sources. For example, content upload module 205 can be configured to only upload content items such as image files or text files. In some embodiments, content upload module 205 can be configured to only upload image files created by a camera of client device $102_i$. Alternatively, content upload module 205 can be configured to upload all content items except for content items of a specified content type and/or originating from a specified source. In these types of embodiments, content upload module 205 can be configured to identify the content type and content source of a content item prior to performing a local index search of the content item. If the content item is determined to be a content type or have a content source that should not be uploaded, the content item can be skipped without performing a local index search on the content item.

In some embodiments, content upload module 205 can determine the content type of a content item from a filename extension associated with the content item. For example, content upload module 205 can determine that the content type of a content item with a filename extension ".jpg" is an image file. Likewise, content upload module 205 can determine that the content type of a content item with a filename extension ".doc" is a text document.

In some embodiments, content upload module 205 can be configured to determine the content source of a content item by analyzing a file path associated with the content item. A file path can identify the folder hierarchy in which the content item is located. In some embodiments, the content source of a content item can be determined from a folder in which the content item is located. For example, content upload module 205 can determine that the content source of a content item with a file path /camera/picture.jpg is a camera because it is included in the /camera folder.

Content upload module 206 can further be configured to update the local upload index. For example, upon a determination that a content item has not been uploaded to content management system 106, (i.e. as a result of a local index search of the content item), content upload module 205 can be configured to update the local upload index to include the unique local identifier associated with the content item. In some embodiments, content upload module 206 can be configured to update the local upload index upon uploading the content item to content management system 106.

To further assure that a content item has not been uploaded to content management system 106, such as by another client device 102 liked to the same account, content upload module 205 can be configured to perform a server index search for each content item determined by the local index search to have not been uploaded to content management system 106. A server index search can include searching a server upload index created by content management system 106 that identifies the content items stored on content management system 106. Client device $102_i$ can be configured to download the server upload index from content management system 106 to perform the server index search. In some embodiments, the server upload index can be specific to a user account. In some embodiments, the server upload index can identify all content items stored on content management system 106. In some embodiments, the server upload index can identify the content items stored in a selection of accounts. For example, the server upload index can identify the content items stored in numerous account associated with a specific user, including a user's personal account and shared accounts.

To create the server upload index, content management system 106 can be configured to create a unique server identifier of each content item stored on content management system 106 and add the unique server identifiers to the server upload index. In some embodiments, the server upload index can be downloaded to client device 102, upon automatic upload of content items being initialized on client device 102$_i$. Thus, upon setting client device 102, to automatically upload content items to content management system 106, a server upload index identifying the content items stored on content management system 106 can be downloaded to client device 102$_i$. For example, a user can select to enable automatic uploads of content items on client device 102$_i$, thus initiating automatic upload of content items on client device 102$_i$ and resulting in downloading of the server upload index.

To perform a server index search for a content item, content upload module 205 can be configured to create a unique server identifier of a content item and search the server upload index for the unique server identifier. Both content management system 106 and content upload module 205 can be configured to use the same method to create a unique server identifier for a content item. Thus, a unique server identifier created for a content item by content upload module 205 will be equal to the unique server identifier created for the same content item by content management system 106.

In some embodiments, a unique server identifier can be created from the content items itself. For example, the unique server identifier can be created from a portion of the content item. Creating the unique server identifier in this manner can be advantageous because it can identify a content item based on the content item itself, rather than only metadata associated with the content item. Thus, a unique server identifier can identify two content items as being equal even though they are associated with different metadata such as having different file names.

To create the unique server identifier, a portion of the content item can be used as an input in a hashing algorithm. The resulting hash output can thus be the unique server identifier. In some embodiments, the first 8 kilobytes of the content item can be used as the input to the hashing algorithm. In some embodiments, the hash output resulting from using a portion of the content item as input to a hashing algorithm can be used along with metadata associated with the content item to create the unique server identifier. For example, the unique server identifier can be the concatenation of the hash output resulting from using the first 8 kilobytes of the content item, with the file size of the content item. Thus, if the hash output of the first 8 kilobytes of the content item is "abc" and the file size of the content item is "12345 kb", the unique server identifier created for the content item can be "abc12345". In some embodiments, the unique server identifier can be created by using the concatenation of the first 8 kilobytes of the content item and the file size of the content item as input in the hashing algorithm.

The hashing algorithm used to create the unique server identifier can be any of a variety of known hashing algorithms. For example, in some embodiments the hashing algorithm can be SHA256.

In some embodiments, the hashing algorithm can result in a unique hash output for each unique input entered into the hashing algorithm. Further, in some embodiments, the hashing algorithm can be deterministic such that if the hashing algorithm is called twice on "equal" input, the same hash output will be returned for each. Thus, for example, entering the same hash input, i.e. input consisting of the same sequence of characters, in the hashing algorithm will result in equal hash outputs.

In some embodiments, the server upload index received by client device 102$_i$ from content management system 106 can include the unique server identifier of each content item stored on content management system 106 that is associated with an account authorized on client device 102$_i$. For example, the server upload index can identify each content item stored on content management system 106 that is associated with a user account authorized on client device 102$_i$. Thus, the server upload index can identify the content items associated with an account authorized with client device 102, but uploaded to content management system 106 from a client device other than client device 102$_i$.

In some embodiments, the server upload index can be downloaded to client device 102, upon initialization or installation of content upload module 205. Thus, in some embodiments, the server upload index can be downloaded to client device 102$_i$ when content upload module 205 is installed on client device 102$_i$ or when it is set up to automatically upload content items to content management system 106. Thus, upon configuring client device 102$_i$ to upload content items to content management system 106, client device 102$_i$ can receive the server upload index identifying the content items already stored on content management system 106. Thus, content upload module will not upload duplicate content items to content management system 106 because content upload module 205 can use the server upload index to identify the content items on client device 102, that are already stored on content management system 106.

Content upload module 205 can perform a server index search for a content item by creating a unique server identifier for the content item and searching the downloaded server upload index to determine if the content item is already stored on content management system 106. If content upload module 205 determines that a unique server identifier of a content item is not found on the server upload index, content upload module 205 can determine that the content item does not exist on content management system 106 and thus content upload module 205 can upload the content item to content management system 106.

If, however, content upload module 205 determines that the unique server identifier of the content item is found on the server upload index, content upload module 205 determines that the content item already exists on content management system 106 and thus content upload module 205 does not upload the content item to content management system 106.

Further, in some embodiments, content upload module 205 can be configured to update the server upload index stored on client device 102$_i$ to include the unique server identifier of a content item upon uploading the content item. Alternatively, content management system 106 can be configured to update the server upload index stored on content management system 106 and transmit an updated server uploaded index to client device 102$_i$. For example, an updated server upload index can be transmitted from content management system 106 to client device 102$_i$ after an upload of content items is received at content management system 106 from client device 102$_i$.

In some embodiments, content management system 106 can be configured to determine if a content item uploaded by client device 102$_i$ is already stored on content management system 106 and transmit an upload error to client device 102$_i$ if the content item already exists on content management system 106. For example, content management system 106 can search for an uploaded content item by performing a server index search on the uploaded content item using a server upload index known to the server. If the server index search indicates that the content item has been uploaded to content management system 106, the upload error can be transmitted to client device 102$_i$. Further, in some embodiments, content management system 106 can discard the uploaded content items and transmit an updated version of the server upload index to client device 102$_i$. Content upload module 205 can be configured to use the updated server upload index to repeat the process of identifying content items that have not been uploaded to content management system 106.

Figure 3:
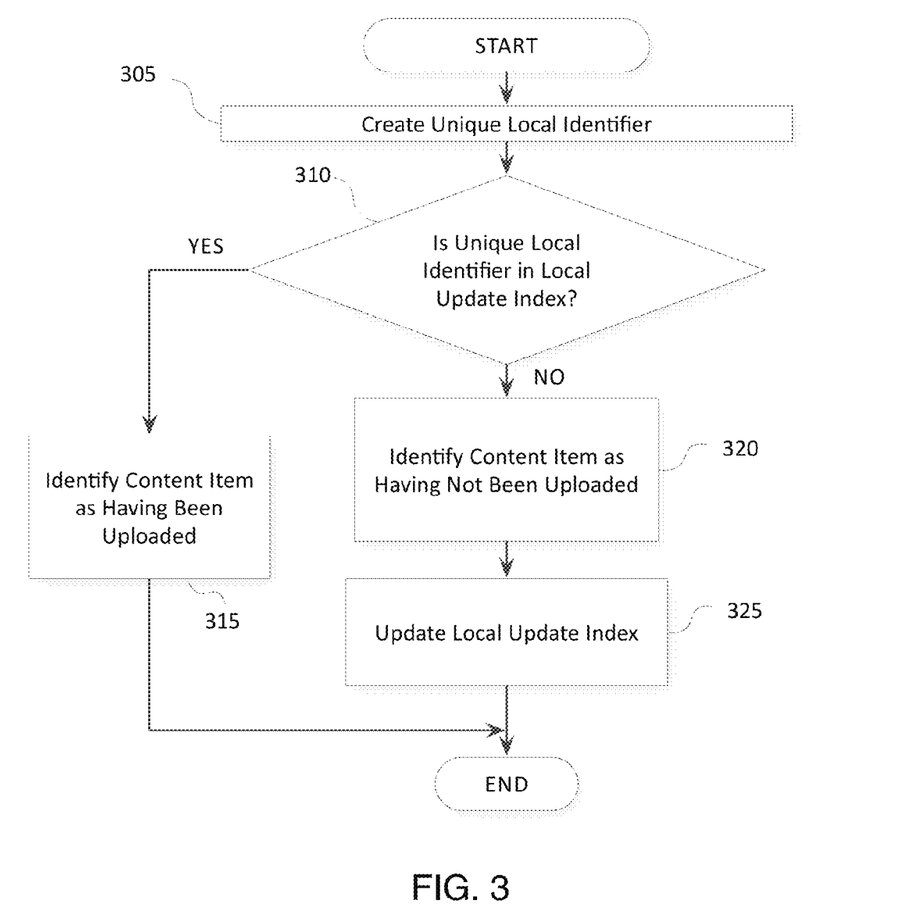
FIG. 3 shows an exemplary method embodiment of performing a local index search to determine if a content item has been uploaded to an online content management system.

FIG. 3 shows an exemplary method embodiment of performing a local index search to determine if a content item has been uploaded by a client device to an online content management system. As illustrated, the method begins at block 305 where a unique local identifier of the content item is created. The unique local identifier can be created from metadata associated with the content item. This can be advantageous because the metadata can be accessed quickly without requiring that the content item itself be opened or accessed.

In some embodiments, the local unique identifier can be created using the file name and file size of the content item. For example, the unique local identifier can be created by concatenating the file name and file size.

Upon creating the unique local identifier of the content item, the method continues to block 310 where it is determined if the local unique identifier exists in a local update index on the client device. The local update index can include the unique local identifier for each content item that has been uploaded to the online content management system from the client device. The local upload index can thus be searched for the unique local identifier to determine if the unique local identifier exists in the local upload index. If the unique local identifier does exist in the local update index, the method continues to block 315 where the content item is identified as having already been uploaded to the online content management system from the client device. The method then ends.

If at block 310, the unique local identifier does not exist in the local update index, the method continues to block 320 where the content item is identified as having not been uploaded to the online content management system. The method then continues to block 325 where the local update index is updated to include the unique local identifier for the content item.

Figure 4:
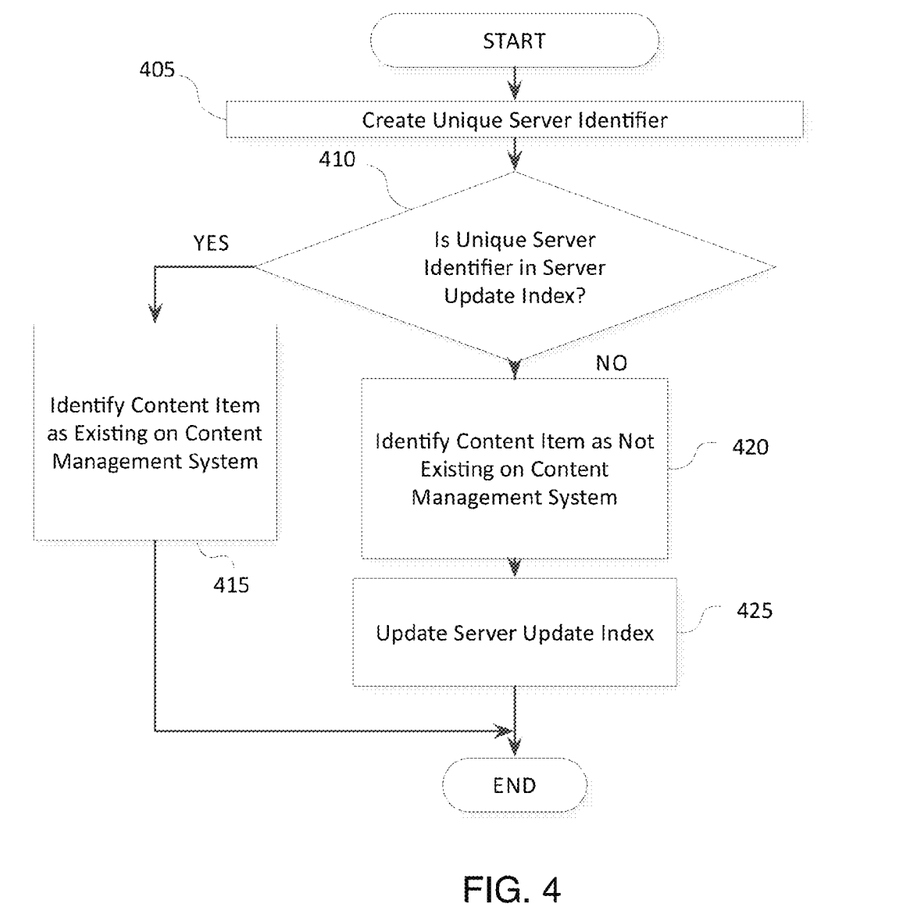
FIG. 4 shows an exemplary method embodiment of performing a server index search to determine if a content item has been uploaded to an online content management system.

FIG. 4 shows an exemplary method embodiment of performing a server index search to determine if a content item is stored on an online content management system. As shown, the method begins at block 405 where a client device creates a unique server identifier of the content item. A unique server identifier can be an identifier created using the content item. This can be advantageous because the unique server identifier can identify two content items as being the same content item, even if the two content items have different names.

In some embodiments, the unique server identifier can be created by using at least a portion of the content item as an input in a hashing algorithm. The resulting hash output can be the unique server identifier.

In some embodiments, the unique server identifier can be created using a combination of a hash output resulting from using a portion of the content item as an input, and metadata associated with the content item. For example, the unique server identifier can be created by concatenating the hash output of the first 8 kilobytes of the content item in a hashing algorithm, with the file size of the content item.

Upon creating a unique server identifier for the content item, the method continues to block 410, where it is determined if the unique server identifier exists in a server upload index. The server upload index can be an index received from the online content management system that includes the unique server identifier for each content item stored on the online content management system. In some embodiments, the server upload index can be downloaded from the online content management system when automatic upload of content items is set up or initiated on the client device.

The server upload index can list the unique server identifier for each content item that is stored on the online content management system at the time the server upload index is downloaded by the client device. If at block 410 it is determined that the unique server identifier exists in the server upload index, the method continues to block 415 where the content item is identified as already existing on the online content management system. The method then ends.

If at block 410 it is determined that the unique server identifier does not exist in the server content index, the method continues to block 420 where the content item is identified as not existing on the online content management system. The method then continues to block 425 where the server upload index is updated to include the unique server identifier. The method then ends.

Figure 5:
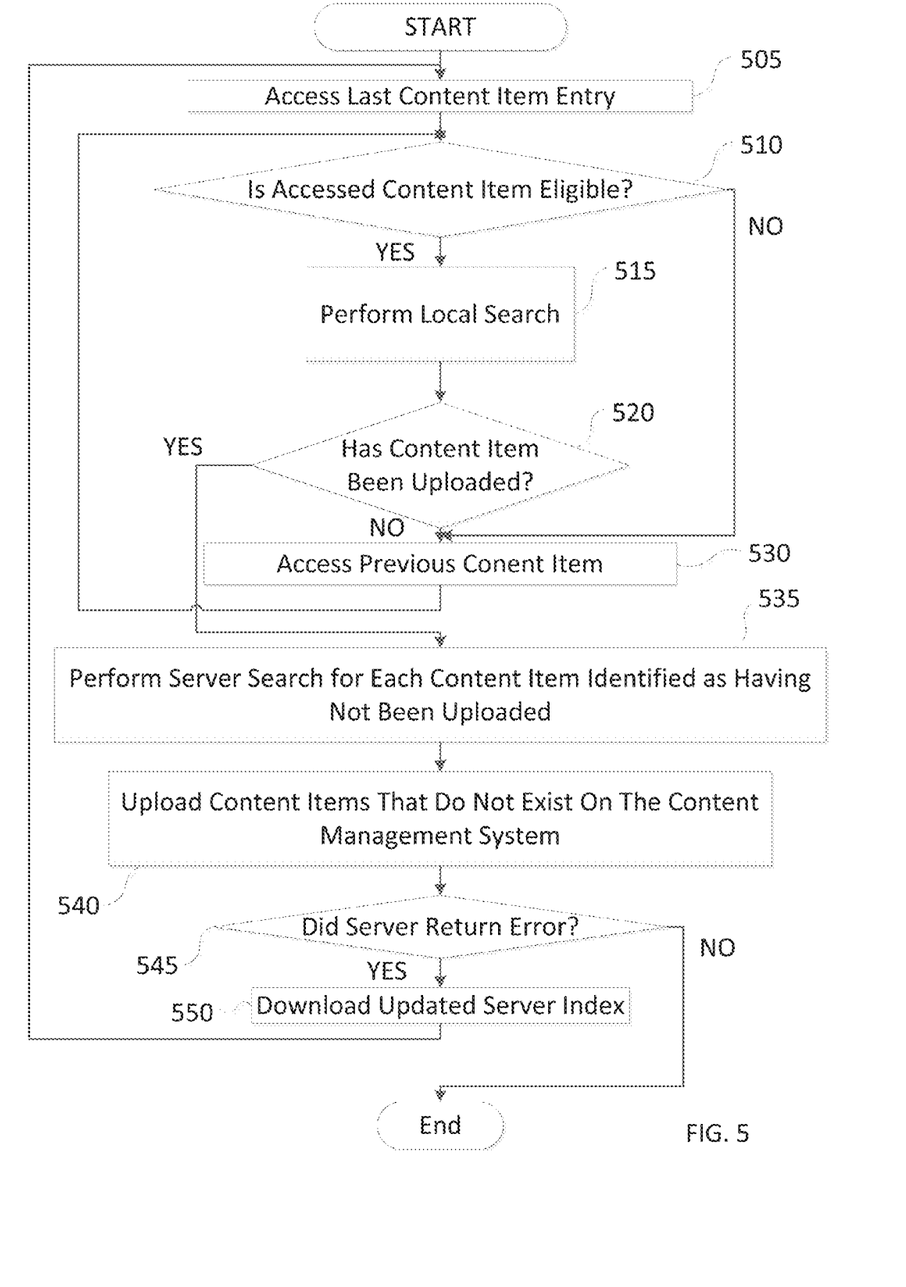
FIG. 5 shows an exemplary method embodiment of automatically uploading content items to an online content management system.

FIG. 5 shows an exemplary method embodiment of automatically uploading content items to an online content management system. As shown, the method begins at block 505 where the last content item entry in memory is accessed. Content items can be stored in memory in an indexed list such that new content items are added to the end of the indexed list. The last content item in memory can thus be the content item most recently added to memory. In this embodiment, the method begins with the last content item in memory (i.e. the newest entry) and traverses the content items in memory in reverse order.

Upon accessing the last content item, the method continues to block 510 where it is determined whether the accessed content item is eligible to be uploaded. For example, in some embodiments, only content items of specified types and/or originating from specified sources are eligible to be uploaded to the online content management system. Thus, the type and source of the content item can be identified to determine whether the content item is eligible to be uploaded. For example, in some embodiments, only content types such as image files are eligible to be uploaded. Alternatively, in some embodiments, only content items originating from a camera are eligible to be uploaded.

In some embodiments, the type of a content item can be identified from the file extension associated with a content item. For example, a content item associated with the file extension ".jpg" can be determined to be an image file.

In some embodiments, the source of a content item can be identified from the file path associated with the content item. For example, a folder in which a content item is located can indicate the source of the content item. Thus, a content item with a file path "/camera/photo.jpg" can be determined to have an originated from a camera because the content item is located in the camera folder.

If at block 510 it is determined that the content item is eligible to be uploaded, the method continues to block 515 where a local index search for the content item is performed to determine whether the content item has been uploaded to the online content management system by the client device. In some embodiments, the local index search can be performed according to the method disclosed in FIG. 3.

If, however, at block 510 it is determined that the content item is not eligible to be uploaded, the method continues to block 530 where the previous content item in memory is accessed. Essentially, the content item that is not eligible to be uploaded is skipped and the method continues to the previous content item in memory. The method then returns to block 510.

At block 520 the method determines if, based on the local index search, the content item has been uploaded to the online content management system. If, at block 520, it is determined that the content item has not been uploaded to the online content management system, the method continues to block 530 where the previous content item in memory is accessed.

If, however, at block 525 it is determined that the content item has been uploaded to the online content management system, the method continues to block 535 where a server index search is performed for each content item identified as having not been uploaded to the online content management system. A server index search can be a second check to determine whether a content item identified having not been uploaded to the content management system is already stored on the online content management system. In some embodiments, the server index search can be performed according to the method disclosed in FIG. 4.

At block 540 the content items that have been identified by the server index search as having not been uploaded to the online content management system are uploaded to the online content management system.

The method then continues to block 545 where it is determined if a server error has been received from the server in response to uploading the content items. A server error can indicate that the server determined that at least one of the uploaded content items is already stored on the online content management system. If at block 545 a server error is received, the method continues to block 550 where an updated server upload index is downloaded from the online content management system. The method then returns to block 505 where the method is repeated using the updated server upload index. Conversely, if at block 545 no server error is returned, the method ends.

Figure 6A:
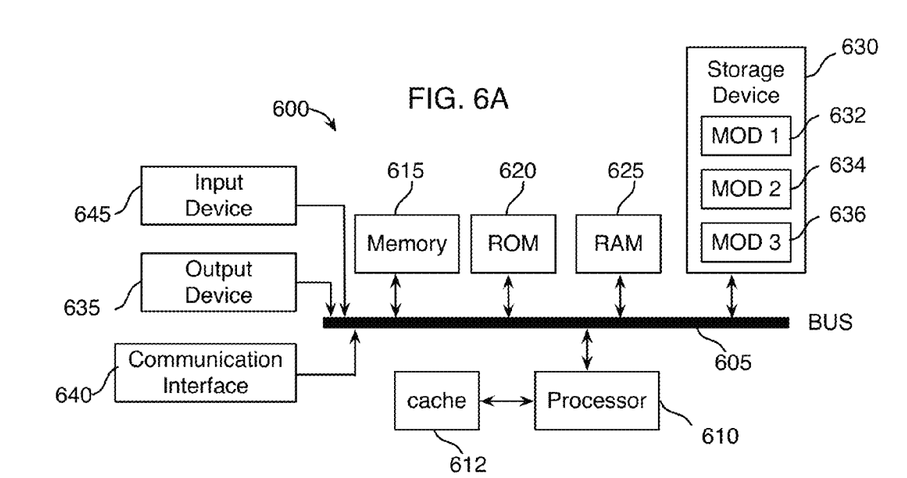
FIGS. 6A & 6B show exemplary possible system embodiments.
Figure 6B:
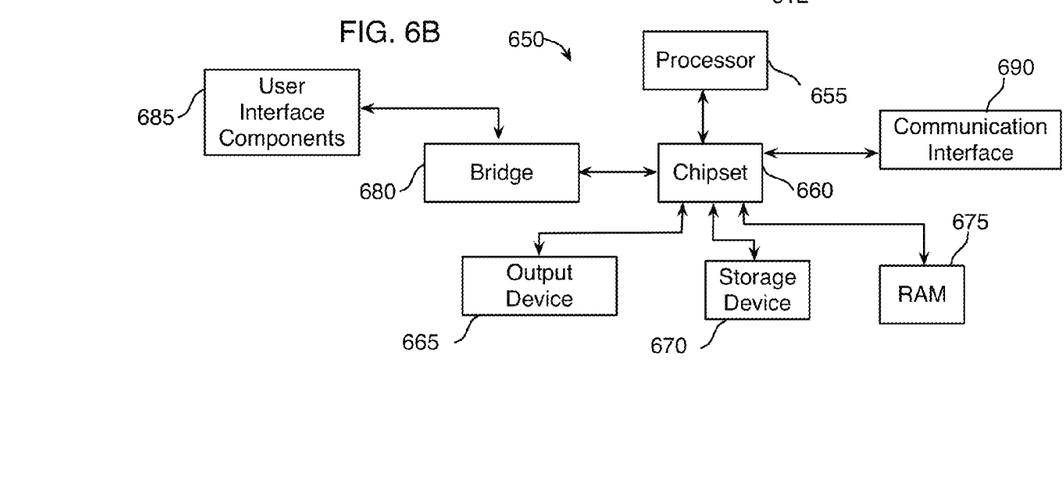

FIG. 6A, and FIG. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
creating, by a processor, a unique local identifier that identifies a first content item, wherein the unique local identifier is created from metadata associated with the first content item;
upon a determination that the unique local identifier does not exist in a local update index, wherein the local update index identifies each content item uploaded to an online content management system by a client device, creating, by the processor, a unique server identifier that identifies the first content item, wherein the unique server identifier is created from a hash output resulting from inputting at least a portion of the first content item in a hashing algorithm, wherein the unique server identifier is different than the unique local identifier; and
upon a determination that the unique server identifier does not exist in a server upload index, wherein the server upload index identifies the content items stored in the online content management system, uploading, by the processor, the first content item to the online content management system.

2. The method of claim 1, wherein the unique local identifier is created from a file name associated with the first content item and a file size associated with the first content item.

3. The method of claim 1, wherein the at least a portion of the first content item includes a first 8 kilobytes of the first content item.

4. The method of claim 1, wherein the unique server identifier is created by concatenating the hash output with a file size of the first content item.

5. The method of claim 1, further comprising:
upon a determination that the unique local identifier exists in the local update index, concluding that the first content item has already been uploaded to the online content management system.

6. The method of claim 1, further comprising:
upon a determination that the unique server identifier exists in the server upload index, concluding that the first content item has been uploaded to the online content management system.

7. The method of claim 1, further comprising:
receiving the server upload index from the online content management system, wherein the server upload index identifies content items that are stored on the online content management system.

8. The method of claim 7, wherein the server upload index is received from the online content management system upon initiating automatic-upload of content items.

9. The method of claim 1, further comprising:
upon receiving, from the online content management system, an upload error indicating that the first content item is already stored on the online content management system, receiving an updated server upload index from the online content management system, wherein the updated server upload index identifies content items that are stored on the online content management system; and replacing the server upload index with the updated server upload index received from the online content management system.

10. A client computing device, comprising:
a processor, and
a memory containing instructions that, when executed by the processor, cause the processor to:
  create a unique local identifier that identifies a first content item, wherein the unique local identifier is created from metadata associated with the first content item;
  upon a determination that the unique local identifier does not exist in a local update index wherein the local update index identifies each content item uploaded to an online content management system by a client device, create a unique server identifier that identifies the first content item, wherein the unique server identifier is created from a hash output resulting from inputting at least a portion of the first content item in a hashing algorithm, wherein the unique server identifier is different than the unique local identifier; and
  upon a determination that the unique server identifier does not exist in a server upload index, wherein the server upload index identifies the content items stored in the online content management system, upload the first content item to the online content management system.

11. The client computing device of claim 10, wherein the instructions further cause the processor to:
  upon a determination that the unique local identifier exists in the local update index, conclude that the first content item should not be uploaded to the online content management system.

12. The client computing device of claim 10, wherein the instructions further cause the processor to:
  upon a determination that the unique server identifier exists in the server upload index, conclude that the first content item has been uploaded to the online content management system.

13. The client computing device of claim 10, wherein the instructions further cause the processor to:
  receive the server upload index from the online content management system, wherein the server upload index identifies content items that are stored on the online content management system.

14. The client computing device of claim 13, wherein the server upload index includes a first unique server identifier for a first content item originating from a second client computing device, different than the client computing device, the second client computing device running an alternate operating system, different than an operating system running on the client computing device, wherein the first content item is associated with an account authorized on the client computing device and the second client computing device.

15. The client computing device of claim 13, wherein the server upload index is received from the online content management system upon initiating automatic-upload of content items on the client computing device.

16. The client computing device of claim 10, wherein the instructions further cause the processor to:

upon receiving, from the online content management system, an upload error indicating that the first content item is already stored on the online content management system, receive an updated server upload index from the online content management system, wherein the updated server upload index identifies content items that are stored on the online content management system; and replace the server upload index with the updated server upload index received from the online content management system.

17. A non-transitory computer-readable medium containing instructions that, when executed by a computing device, cause the computing device to:
  create a unique local identifier that identifies a first content item, wherein the unique local identifier is created from metadata associated with the first content item;
  upon a determination that the unique local identifier does not exist in a local update index, wherein the local update index identifies each content item uploaded to an online content management system by a client device, create a unique server identifier that identifies the first content item, wherein the unique server identifier is created from a hash output resulting from inputting at least a portion of the first content item in a hashing algorithm, wherein the unique server identifier is different than the unique local identifier; and
  upon a determination that the unique server identifier does not exist in a server upload index, wherein the server upload index identifies the content items stored in the online content management system, upload the first content item to an online content management system.

18. The non-transitory computer-readable medium of claim 17, wherein the instructions further cause the computing device to:
  upon a determination that the unique local identifier exists in the local update index, conclude that the first content item has been marked to not be uploaded to the online content management system.

19. The non-transitory computer-readable medium of claim 17, wherein the instructions further cause the computing device to:
  upon a determination that the unique server identifier exists in the server upload index, conclude that the first content item has been uploaded to the online content management system.

20. The non-transitory computer-readable medium of claim 17, wherein the instructions further cause the computing device to:
  receive the server upload index from the online content management system, wherein the server upload index identifies content items that are stored on the online content management system.

21. The non-transitory computer-readable medium of claim 20, wherein the server upload index is received from the online content management system upon initiating an automatic-upload application.

22. The non-transitory computer-readable medium of claim 17, wherein the instructions further cause the computing device to:
  upon receiving, from the online content management system, an upload error indicating that the first content item is already stored on the online content management system, receive an updated server upload index from the online content management system, wherein the updated server upload index identifies content items that are stored on the online content management system; and replace the server upload index with the updated server upload index received from the online content management system.

\* \* \* \* \*